United States Patent [19]
Meyer et al.

[11] Patent Number: 5,880,363
[45] Date of Patent: Mar. 9, 1999

[54] PROCESS FOR CHECKING AIR PRESSURE IN VEHICLE WHEEL TIRES

[75] Inventors: Hans-Joachim Meyer, Steisslingen; Walter Ulke, Friedrichshafen, both of Germany

[73] Assignee: Temic Telefunken microelectronic GmbH, Heilbronn, Germany

[21] Appl. No.: 906,999

[22] Filed: Aug. 6, 1997

[30] Foreign Application Priority Data

Aug. 9, 1996 [DE] Germany ............ 196 32 150.6

[51] Int. Cl.⁶ .................................................. B60C 23/00
[52] U.S. Cl. ................ 73/146.5; 73/146.4; 340/445; 340/446; 340/447
[58] Field of Search ............... 73/48, 49, 146.2, 73/146.3, 146.4, 146.5; 340/442, 443, 445, 446, 447

[56] References Cited

U.S. PATENT DOCUMENTS

| | | | |
|---|---|---|---|
| 5,109,213 | 4/1992 | Williams | 73/146.5 |
| 5,231,872 | 8/1993 | Bowler et al. | 73/146.5 |
| 5,289,160 | 2/1994 | Fiorletta | 73/146.5 |
| 5,335,540 | 8/1994 | Bowler et al. | 73/146.5 |
| 5,540,092 | 7/1996 | Handfield et al. | 73/146.5 |
| 5,585,554 | 12/1996 | Handfield et al. | 73/146.5 |
| 5,600,301 | 2/1997 | Robinson, III | 73/146.5 |
| 5,602,524 | 2/1997 | Mock et al. | 73/146.5 |
| 5,612,671 | 3/1997 | Mendez et al. | 73/146.5 |
| 5,717,135 | 2/1998 | Fiorletta et al. | 73/146.5 |
| 5,728,933 | 3/1998 | Schultz et al. | 73/146.5 |
| 5,741,966 | 4/1998 | Handfield et al. | 73/146.5 |
| 5,774,047 | 6/1998 | Hensel, IV | 340/442 |
| 5,790,016 | 8/1998 | Konchin et al. | 73/146.5 |

FOREIGN PATENT DOCUMENTS

| | | |
|---|---|---|
| 626911 | 12/1994 | European Pat. Off. . |
| 0769395 | 4/1997 | European Pat. Off. . |
| 3930489 | 3/1991 | Germany . |

*Primary Examiner*—Ronald Biegel
*Assistant Examiner*—Eric S. McCall
*Attorney, Agent, or Firm*—Venable; George H. Spencer

[57] ABSTRACT

A process for checking the air pressure in the tires of motor vehicle wheels wherein at least a pressure signal characteristic for the air pressure will be picked up as a measured signal by a measurement device located in or on the tire of each motor vehicle wheel, wherein at least. a data signal containing a measured air pressure value derived from the pressure signal as well as an identification value characteristic for the respective transmitter device will be generated and output by a transmitter device located in or on the tire of each motor vehicle wheel, wherein the data signal output by the transmitter devices will be received by a reception device located at a distance to the motor vehicle wheels, and wherein the identification value of the transmitter device contained in the data signal will be compared by a control unit to identification comparison values assigned to the respective transmitter devices such that further processing of the data signal by the control unit will be effected only, if the identification value and the identification comparison value meet a specified assignment criterion.

6 Claims, 3 Drawing Sheets

PROCESS FOR CHECKING AIR PRESSURE IN VEHICLE WHEEL TIRES

BACKGROUND OF THE INVENTION

The invention concerns a process for checking air pressure in vehicle wheel tires, as known from EP 0 626 911 B1.

The correct air pressure setting in vehicle wheel tires is of major significance for reasons of economic efficiency and driving safety: an incorrectly set air pressure value—i.e. if the actual air pressure is either too high or too low—will cause increased tire wear on the one hand, necessitating early tire changes, as well as an increase in fuel consumption, and will lead on the other hand to an increase in sidewall flexing as a result of which tire temperatures rise very significantly; this may lead to the destruction of the tire even (in particular when the motor vehicle is traveling at high speeds) which frequently causes extremely serious traffic accidents.

For these reasons, tire pressures should/must be checked at regular intervals; in the case of trucks this check should/must be carried out on a daily basis. However, this check is frequently not carried out as measuring tire air pressure is a relatively timeconsuming and even dirty task which also requires a certain degree of technical skill. Therefore, processes are known already, for example from DE 39 30 489 A1, that are used to measure the air pressure in the tires of motor vehicle wheels by means of a pressure sensor located on the motor vehicle wheel and to indicate to the driver by some suitable means the air pressure signal actually measured.

In the generic type process of EP 626 911 B1, the pressure obtaining in the air chamber of the motor vehicle wheel will be measured by means of a pressure measurement device fitted in or on the tire of each motor vehicle wheel; then, an electric signal representative of the measured air pressure value will be output, and, by means of a transmitter device fitted in or on the tire of each motor vehicle wheel (directly on the valve, for example), a data signal comprising at least the measured air pressure value and an identification value will be generated from the electrical signal, and output; then, the data signals output by the transmitter devices will be detected by means of a stationary reception device, or a reception device fitted in the vehicle, and by means of a control unit these data signals will be evaluated. For reasons of data transmission reliability between the transmitter devices and the reception device (protection against interference signals), the reception unit features identification comparison values that are assigned to the respective identification values of the transmitter devices (thus, the identification value and the assigned identification comparison value are either identical or are found to be in a certain relationship towards each other); fiirther processing of the data signal will take place only if the identification value transmitted by the transmitter device and received by the reception device is identical with the identification comparison value of the reception unit or has been assigned to the same. The identification comparison value can be changed in order to allow a (variable) assignment of the positions of the motor vehicle wheels (for instance when changing a tire, or when changing over from summer tires to winter tires and vice versa); to this end, a control unit enables the reception device to be switched over from its normal operating mode—in which air pressure is checked—into a pairing mode, in which the reception device will receive the identification value output by each transmitter device and store this value as an identification comparison value together with the assignment of the respective wheel position. The disadvantage here is that the assignment or definition of the positions of the motor vehicle wheels is very complex and does not happen automatically.

OBJECT OF TBE INVENTION

The object of the present invention is to provide for a process of the type described above by means of which the positions of the motor vehicle wheels will be easily and automatically assigned.

According to the invention this task will be solved by the process according to claim 1. Preferred further applications of this process will be the subject of the further claims.

SUMMARY OF THE INVENTION

In the process presented here, an assignment of the position of the motor vehicle wheels relative to the data signals will be effected by means of a bi-directional data transmission process between the control unit or reception device and the motor vehicle wheels. The control unit generates an activation signal (with a frequency of 60 kHz, for example) which is then selectively fed as a long-wave signal into a long-wave unit located on the motor vehicle wheel or in the vicinity of the motor vehicle wheel (for instance, by means of a line connection), with one long-wave unit being assigned to each motor vehicle wheel. Using a lineless transmission, an inductive coupling for example, this long-wave signal will be provided by the long-wave unit of the transmitter device assigned to this aforesaid long-wave unit and located in the motor vehicle wheel; the transmitter device will process the long-wave signal and generate therefrom a long-wave identification signal—the long-wave identification signal thus contains the information which of the motor vehicle wheels was selected for the assignment of its position. From the transmitter device, the data signal containing the standard measurement data, the identification value, and possibly the long-wave identification signal will be transmitted to the control unit as a HF signal (carrier frequency—for example—433.92 MHz). The control unit will evaluate the incoming data signal; in particular, the control unit will check whether the data signal contains a long-wave identification signal: as only one of the data signals output by the transmitter devices can have a long-wave identification signal, this makes it easy to assign the position of the motor vehicle wheel by means of the transmitter device identification value contained in the data signal because only that motor vehicle wheel is known to the control unit to which it has selectively applied the activation signal (long-wave signal).

An implementation of the motor vehicle wheel assignment can be effected according to specific criteria or when specific conditions obtain: for instance, whenever the engine is started, at regular time intervals (every hour, for example), on completion of a predefined travel distance (every 1000 km for example); and in relation, for instance, to the actual traveling speed, or after a manual request by the driver or operator (after a tire change, for example).

The long-wave identification signal can be generated in many different ways by means of the long-wave signal, and then attached to the data signal; for instance, it is possible to generate the long-wave identification signal as the reading of a counter, which, for a "positive" long-wave identification signal, differs significantly from the reading for a "negative" long-wave identification signal, or the long-wave identification signal can take the form of an analog integrator.

The air pressure reading and/or a warning in the case of an incorrect air pressure value (value is either too low or too high) can be visually (optically, acoustically, or haptically) communicated to the driver by means of a display unit if predefined threshold values are exceeded.

DESCRIPTION OF A PREFERRED EMBODIMENT

Figure 1:
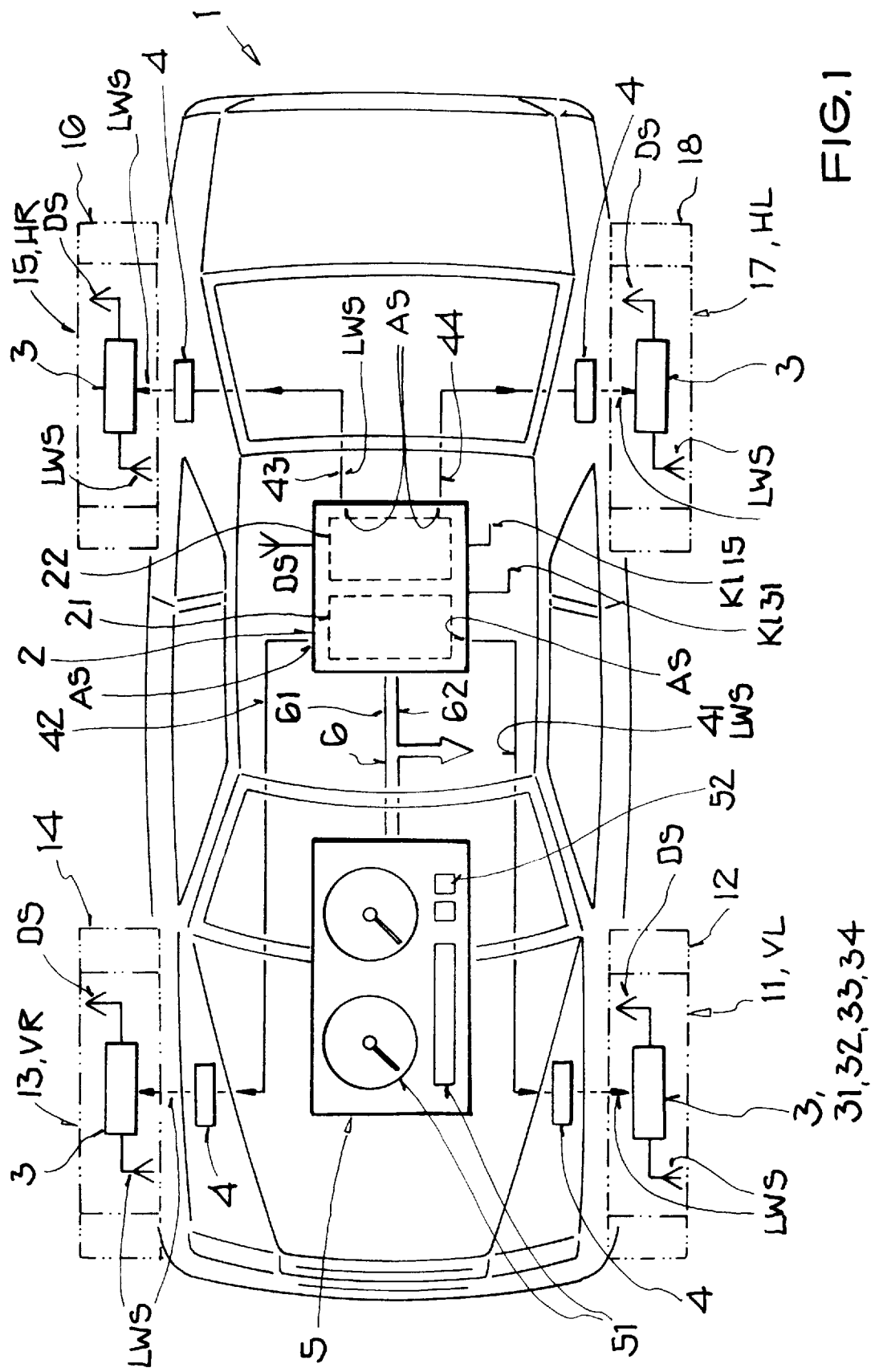
FIG. 1 Plan view of a motor vehicle complete with all system components for implementing the process, FIG. 2 Block diagram of the control module comprising control unit and reception device, FIG. 3 Block diagram of the wheel module comprising transmitter device, measurement device, and long-wave reception device

Using the drawing complete with FIGS. 1 to 3 the process described above will be explained in more detail below.

According to FIG. 1 the process for checking air pressure in the tires 12, 14, 16, 18 of the motor vehicle wheels 11, 13, 15, 17 on motor vehicle 1, and the assignment of the positions front left, front right, rear left, rear right for the motor vehicle wheels 11, 13, 15, 17, will be implemented by means of the following components:

- a control module 2 comprising a control unit 21 and a reception device 22, which, for instance, may either be embodied as a separate control device or integrated into such a control device,
- a wheel module 3—comprising a transmitter device 31, a measurement device 32, a long-wave reception device 33, and a control device 34—located in or on the tires 12, 14, 16, 18 of the motor vehicle wheels 11, 13, 15, 17, which transmits a data signal DS as a HF signal to control module 2,
- a long-wave unit 4 located in or on or in the vicinity of each motor vehicle wheel 11, 13, 15, 17 (inside the wheelhousing, for instance) and respectively assigned to a wheel module 3, which long-wave unit 4 is activated by means of an activation signal AS generated by the control module 2 and transmitted via lines 41, 42, 43, 44 as a long-wave signal LWS, and which long-wave unit 4 provides—when activated—this long-wave signal LWS to the assigned wheel module 3 (the long-wave reception device 33) (for instance by means of a lineless inductive transmission),
- dashboard module 5 comprising a display uinit 51 for the (digital and/or analog) display of various readings (air pressure, for example) or warning messages (an optical warning light or an acoustic warning device, for example), and a control unit 52 complete with push-button keys and/or switches (for manual activation of control module 2, for example),
- a data transmission line 6 embodied as a data bus, for example, which connects control module 2 with the dashboard module 5 and other control devices of motor vehicle 1 (for example, via data lines 61, 62).

Figure 2:
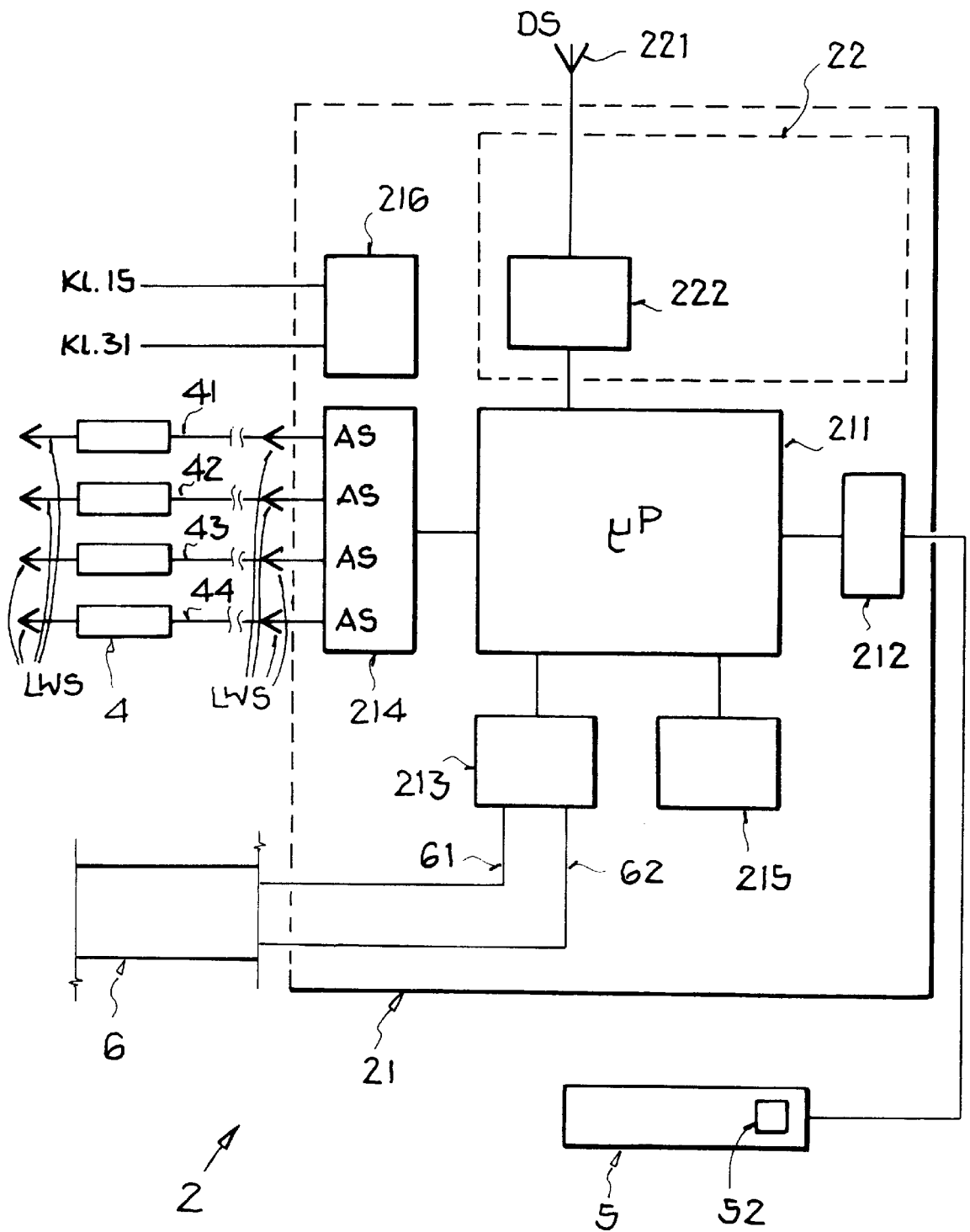

According to FIG. 2 of control module 2, the control unit 21 comprises as its principal components a microprocessor 211 for signal/data processing and control of the process operation over time, an input 212 to which the control unit 52 of the dashboard module 5 is connected, an interface 213 for connection to data bus 6 (for instance, a bus interface 213 for connection to the two bus lines 61, 62 of a CAN data bus 6), a long-wave transmitter 214 for feeding a long-wave signal LWS to each respective long-wave unit 4 by means of lines 41, 42, 43, 44, a monitoring circuit 215 ("watch dog"), and a power supply 216—connected, for example, to the battery (terminal 15, terminal 31) of motor vehicle 1—complete with overvoltage and inverse polarity protection to ensure that there is always a supply of electric power.

The reception device 22 comprises a (HF-) reception aerial 221 for picking up the data signal DS transmitted by the transmitter devices 31 of wheel modules 3 and a HF reception device 222 tuned to the frequency of the data signal DS, which HEF reception device 222 provides the data signal DS to microprocessor 211 for further processing.

Figure 3:
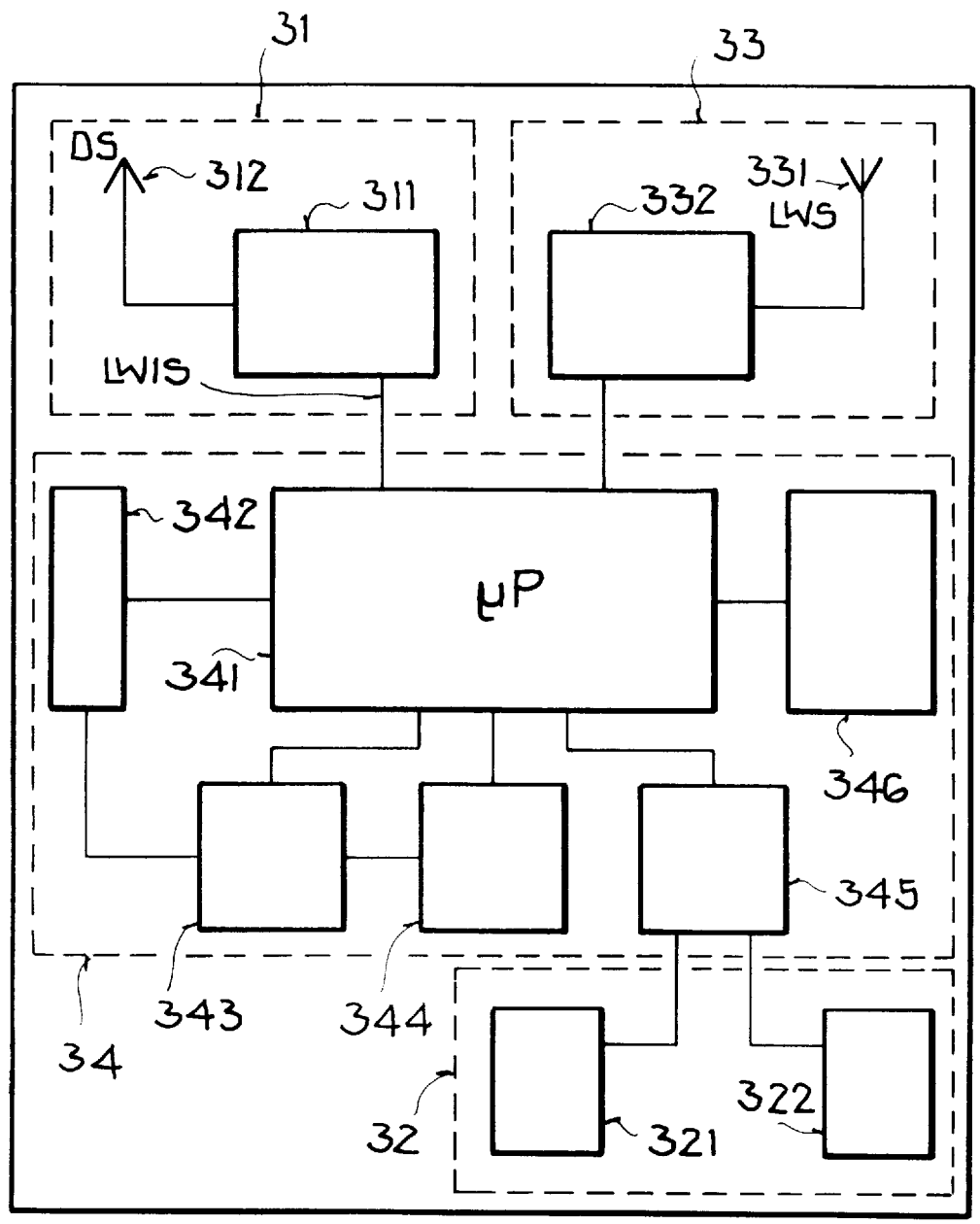

According to FIG. 3 of wheel module 3, the transmitter device 31 comprises a HF transmitter 311 for generating a HF data signal DS (having a frequency of 433.92 MHz, for example) and a HF aerial 312 for transmitting the data signal DS (transmission to control module 2).

The control unit 34 comprises a microprocessor 341 or, alternatively, an application-specific integrated circuit (ASIC) for controlling the process operation over time and for signal/data processing, a (lithium) battery 342 for ensuring the voltage supply to wheel module 3, a power supply component 343, a time counter 344 for setting a specified clock cycle or counter value, a digital/analog converter 345 for converting the analog measured values of measurement device 32 into digital output values and an interface circuit 346 for parametrization of the sensor-specific measured values.

The measurement device 32 comprises various different sensors for picking up the measured values of specified measurement quantities: for example, a pressure sensor 321 for picking up the air pressure in the tires 12, 14, 16, 18, and a temperature sensor 322 for picking up the temperature of the tires 12, 14, 16, 18.

The long-wave reception device 33 comprises a long-wave aerial 331 for picking up the long-wave signal LWS transmitted by the assigned long-wave unit 4, and a long-wave receiver 332 (for the frequency range from 40 to 80 kHz, for example) for preparing the long-wave signal LWS before this is passed on to microprocessor 341 of control unit 34, which generates from this long-wave signal LWS the long-wave identification signal LWIS. For example, it is possible to use an integrated circuit (IC) employed for the reception of long-wave time signals in radio clocks as the aforesaid long-wave receiver 332.

The location of the long-wave units 4—which may contain coils, for example,—in the vicinity of their respective assigned wheel module 3 ensures that the individual motor vehicle wheels 11, 13, 15, 17 can be selected individually by means of the long-wave signal LWS without there occurring cross-talk to other motor vehicle wheels; therefore, a clear assignment of the position front left, front right, rear right, rear left of the motor vehicle wheels 11, 13, 15, 17 to the data signals DS transmitted by the transmitter devices 31 of wheel modules 3 can be effected by means of the long-wave identification signal LWIS contained in the data signal DS (aided by the identification values of the transmitter devices 31 contained in the data signal DS).

What is claimed is:

1. Process for checking the air pressure in the tires (12, 14, 16, 18) of motor vehicle wheels (11, 13, 15, 17) wherein by means of a measurement device (32), located in or on each tire (12, 14, 16, 18) of each motor vehicle wheel (11, 13, 15, 17), at least a pressure signal characteristic for the air pressure will be picked up as a measured signal, transmitter device (31), located in or on each tire (12, 14, 16, 18) of each motor vehicle wheel (11, 13, 15, 17), at least a data signal (DS) containing a measured air pressure value derived from the pressure signal as well as an identification value characteristic for the respective transmitter device (31) will be generated and output, a reception device (22) located at a distance to the motor vehicle wheels (11, 13, 15, 17), the data signal (DS) output by the transmitter devices (31) will be received, a control unit (21), the identification value of the transmitter device (31) contained in the data signal (DS) will be compared to identification comparison values assigned to the respective transmitter devices (31) such that further processing of the data signal (DS) by the control unit (21) will be effected only, if the identification value and the identification comparison value meet a specified assignment criterion, the assignment criterion, an assignment of the respective position (front left, front right, rear left, rear right) of the motor vehicle wheel (11, 13, 15, 17) will be effected where the delete identification comparison value will be adapted to the identification value of the respective transmitter device (31), and wherein the assignment of the respective position (front left, front right, rear left, rear right) of the motor vehicle wheel (11, 13, 15, 17) to the data signals (DS) is effected by means of a bi-directional data transmission process, in which an activation signal (AS) generated by the control unit (21) will be fed as a long-wave signal (LWS) selectively to one respective motor vehicle wheel each (11 or 13 or 15 or 17), the long-wave signal (LWS) is respectively received by a long-wave unit (4) located in or on each motor vehicle wheel (11, 13, 15, 17) and respectively assigned to a transmitter device (31), the long-wave unit (4) provides the long-wave signal (LWS) to the respective assigned transmitter device (31) which generates therefrom a long-wave identification signal (LWIS), a data signal (DS) containing the long-wave identification signal (LWIS) and the identification value of the respective transmitter device (31) will be output as high frequency signal from the transmitter device (31) to the control unit (21), and the control unit (21) identifies the position (front left, front right, rear left, rear right) of the motor vehicle wheel (11, 13, 15, 17) by means of the long-wave identification signal (LWIS).

2. Process according to claim 1 wherein the control unit (21) feeds the long-wave signal (LWS) successively to all motor vehicle wheels (11, 13, 15, 17).

3. Process according to claim 1 wherein the control unit (21) generates the activation signal (AS) if certain specified conditions exist.

4. Process according to claim 3 wherein the activation signal (AS) is generated at specified time intervals, and/or after the Motor vehicle (1) has been driven over a specified distance, and/or in relation to the traveling speed of the motor vehicle (1), and/or when starting the engine of the motor vehicle (1), and/or when requested manually.

5. Process according to claim 1 wherein the long-wave identification signal (LWIS) is generated as the reading of a counter or as a voltage value of an analog integrator.

6. Process according to claim 1 wherein the data signal (DS) received by the reception device (22) and processed by the control unit (21) will be displayed by means of a display unit (51).

* * * * *